United States Patent
Hensley, Jr. et al.

[15] 3,655,517
[45] Apr. 11, 1972

[54] MOLDED PLASTIC SOLAR STILL

[72] Inventors: Justin C. Hensley, Jr., 4464 Davenport Ave., Oakland, Calif. 94619; Paul G. Young, 6500 Buena Ventura Ave., Oakland, Calif. 94605

[22] Filed: Oct. 22, 1969

[21] Appl. No.: 868,478

[52] U.S. Cl. ........................................202/234, 203/DIG. 1
[51] Int. Cl. ...............................................................B01d 3/00
[58] Field of Search .........................202/234, 173, 236, 205; 203/10, 100, 72, DIG. 1; 159/1 S

[56] References Cited

UNITED STATES PATENTS

| | | | |
|---|---|---|---|
| 2,614,973 | 10/1952 | Burrows | 203/72 X |
| 2,848,389 | 8/1958 | Bjorksten | 202/234 |
| 2,877,164 | 3/1959 | Meyer | 202/185 |
| 3,006,818 | 10/1961 | Lappala et al. | 202/234 |
| 3,159,554 | 12/1964 | Mount | 202/234 |
| 3,282,327 | 11/1966 | Hardy et al. | 159/1 S |
| 3,290,230 | 12/1966 | Kobayashi | 202/234 |
| 3,290,231 | 12/1966 | Ries et al. | 203/10 |
| 3,336,206 | 8/1967 | Sasaki et al. | 203/10 X |
| 3,351,538 | 11/1967 | Andrassy | 159/1 S |
| 2,446,997 | 8/1948 | Brewer et al. | 202/205 X |

*Primary Examiner*—Norman Yudkoff
*Assistant Examiner*—J. Soffer
*Attorney*—Townsend and Townsend

[57] ABSTRACT

A dimensionally rigid solar distillation apparatus for vaporization and condensation of water, including a slanting transparent sheet supported on generally upright wall members extending from a generally flat base wherein the wall members and base are formed from pressure molded, foamed plastic material.

5 Claims, 4 Drawing Figures

PATENTED APR 11 1972 3,655,517
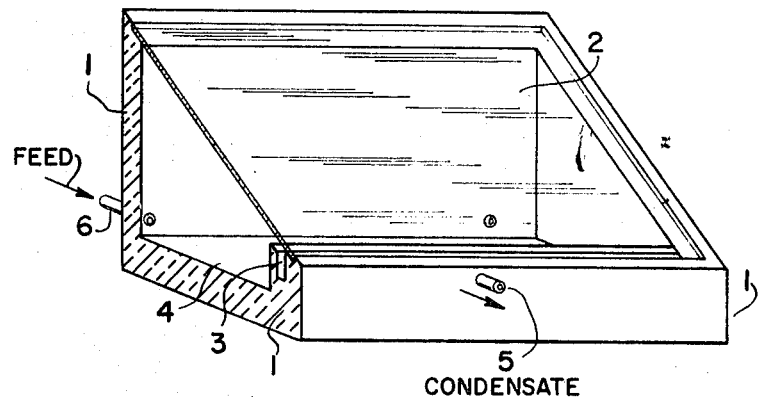
FIG. I
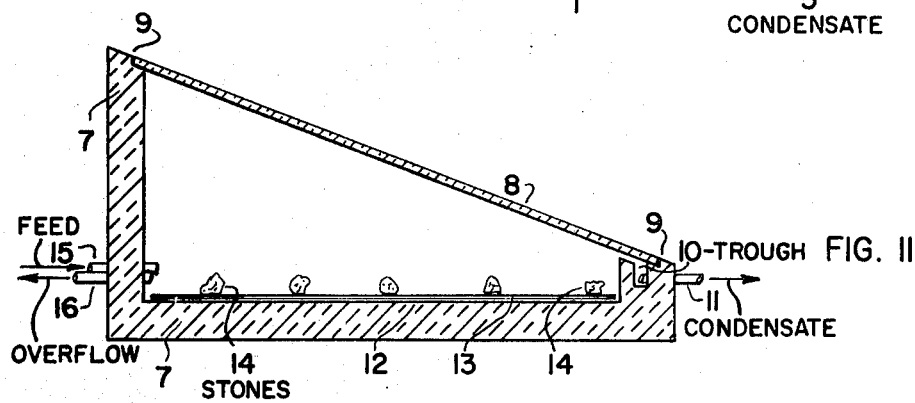
FIG. II
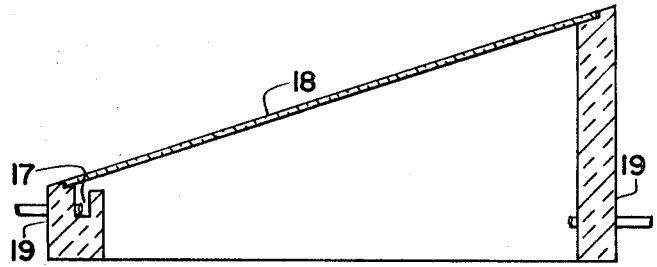
FIG. III
FIG. IV
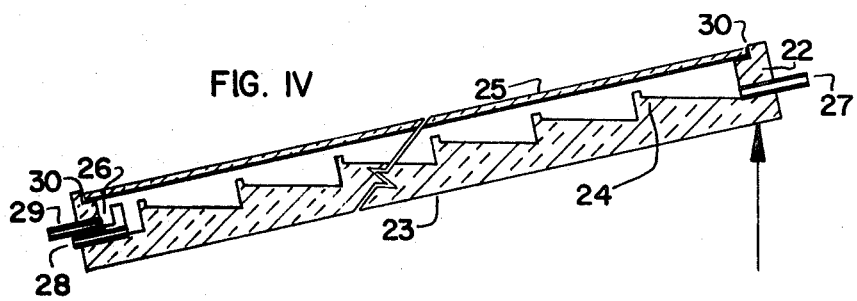
INVENTORS:
Justin C. Hensley Jr
Paul G. Young

MOLDED PLASTIC SOLAR STILL

In summary, this invention has as its objective an improved apparatus for vaporizing liquids or for condensing vapors or both, utilizing radiant or solar energy and using the environment such as air as the coolant to effect condensation. Major improvements over the prior art results from the use of moldable materials of construction that also provide for good thermal insulation so as to reduce the manufacturing cost and to enhance thermal efficiencies of vaporization and to increase the distillate productivity rates. This specification will be directed mainly to the production of potable water from saline water but wider application is anticipated and is implied.

The art of producing potable water from brackish water or sea water by means of solar distillation is well known and is quite suitable for rural domestic use or for small villages, particularly in coastal areas. Several designs of solar stills are known including rectangular and round based horizontal stills and tilted tray stills. Conventional materials of construction are wood, plastic, metal or concrete frames supporting a slanted glass or transparent plastic cover sheet over a pool or pools of the brine; the transparent sheet allows radiant heat to pass through it and thus enter the still and to provide heat to vaporize the distilland. Vapor thus produced condenses on contact with the lower side of the sloping transparent sheet that is cooled by the atmospheric air outside the still. Heat of condensation of the vapor is thus passed to the atmosphere through the transparent sheet and the condensate adhering to the lower side of the sloping sheet is collected by gravity flow and is piped out of the still for use. The distilland consisting of brackish water is replenished either intermittently or by constant flow through the base area of the still. Solar energy is thus captured in the still, is utilized to provide heat of vaporization of unpotable water and is passed to the atmosphere upon condensation of the vapor into potable distillate water. The driving force, solar heat, is free but the economy and productivity of a solar still can be greatly enhanced by improved thermal efficiency and by reducing the cost of construction and of materials. This specification provides for such improvements over the prior art.

The thermal efficiency of a solar still is greatly improved by this invention comprising the use of moldable foamed plastics, particularly expanded foamed plastics; for instance, expanded polystyrene, or a similar material, having superior heat insulating properties; and this represents a major advantage over the prior art. The structural strength of such molded forms and the light weight of such materials provide for improved materials economy, and the ease of manufacturing and the low unit cost of molding a multiplicity of the required frames or shapes constitute substantial improvements over the prior art.

DESCRIPTION OF FIGURES

FIG. I is a perspective side view section of a preferred form of the Molded Plastic Solar Still.

FIG. II is a side view section of a Molded Plastic Solar Still.

FIG. III is a side view section of a Molded Plastic Solar Still for use on damp soil or for placing over damp material containing a distilland.

FIG. IV is a side view section of a generally rectangular Molded Plastic Solar Still that is tilted when in operation.

DESCRIPTION OF PREFERRED EMBODIMENTS

The rate of distillate production of a solar still depends mainly upon the rate of absorption of solar heat, the difference in temperature between the surface of the brine heated by solar radiation and the condensing surface, and the surface areas at which mass or heat transfer takes place. Since the solar heat received for a given location and shape and size of solar still is fixed, the productivity rate can be enhanced most significantly by reducing thermal losses so that a maximum of the captured heat is used for evaporation and is passed to the atmosphere by condensation of the vapor on the lower side of the air-cooled transparent sheet. A major advantage of the still of this invention is that it provides for excellent heat insulation to reduce thermal losses to a minimum. In fact, it has been found that the productivity rate of the preferred solar still of this specification exceeds that of comparable solar stills of conventional construction and materials by 60 to 100 percent when tested simultaneously under equal operating conditions. The materials of construction as conceived in this invention, viz foamed plastic having high thermal insulating properties, constitutes a significant improvement over the prior art. A second significant improvement over the prior art results from the mode of construction, viz by moulding the frame for supporting the transparent sheet. For instance, the cost of materials and of construction of a unit of the preferred solar still of this specification can be less than half the cost of a comparable still of conventional materials and construction when both are produced in quantities in excess of 500.

The shape and size of the molded plastic solar still of this specification are not confined to the preferred embodiments shown and described; this material and method of construction can be utilized in unlimited shapes and sizes. The mode of construction and materials of construction of this specification are applicable to all forms of solar stills known in the art. The lightweight material used for construction, readily adaptable to mass production by molding, and the dimensional rigidity of the molded form of this material, and the capability of being made in units or modules of any desired shape and size represent a major advance in the art.

The unitized mode of construction of this specification readily allows for the replacement of defective units in a multiunit solar still without interrupting the operation of remaining units.

When the bottom (base) of the still is omitted, it can be used to produce potable water from vapors released from damp materials, for instance by placing the frame on the ground. This can be of vital importance under desert conditions. Similarly, potable water can be produced from vegetable matter or another source of dampness, for example, from mud or moist earth, especially at night when heat stored in the earth produced vapor that condenses readily on the cover glass that is in contact with the cool night air, a condition somewhat comparable to dew formation. In addition, a perforated base for instance of sponge-like material can be inserted in the still or can replace its bottom and can be soaked with non-potable water, for instance when used for survival at sea.

Another advantage of this mode and material of construction is that it allows assembly of survival kits, for example, at sea where the buoyancy of the material allows it to float and to be easily recovered for instance after being dropped from a plane.

The following is a description of the preferred embodiments of this invention and of their operation, with reference to the FIGS.

FIG. 1 shows a perspective section view of a molded foamed plastic solar still comprising a rectangular-based molded frame having generally vertical sides 1 supporting a slanted glass cover 2 for transmitting solar radiation into the body of the still. The top edge of the molded side walls of the still are shaped to receive the glass cover 2, for instance standard window pane of suitable dimensions, and to form a good seal therewith. This seal may be improved by applying any suitable glazing compound or sealant to seal or secure the glass 2 to the frame 1. The inclination or slant of the cover glass 2 is such as to allow passage of a maximum of solar radiation and to permit condensate to collect and drain from it as a thin film in contact with the lower (inside) surface of the cover glass 2. This condensate is collected in a horizontal trough 3 that may be molded into the base frame 1 along its lower side wall but being separated from the main liquid reservoir 4 in the still, for instance, by a suitable molded divider wall having a top edge spaced from the cover glass 2. Condensates collected in the trough 3 can be removed from the still by means of a suitable conduit, for instance, a pipe 5 communicating with the trough and extending through the wall of the still. The main liquid reservoir 4 can be molded as an integral part of the frame and provides for a shallow pool of distilland that can be replenished as required, for instance, through an inlet conduit 6 at the back side of FIG. 1. A similar outlet conduit located a distance from the inlet conduit 6 may be provided to allow continuous or intermittent drainage of concentrated residual distilland from the still.

FIG. 11 shows a side view section of a molded plastic solar still, the base and sides 7 of which are made preferably from expanded or foamed plastic, for instance, expanded polystyrene, polyurethane or another suitable moldable material having good thermal insulating characteristics. A transparent cover sheet, for instance, glass of window pane type 8, fits over or on the sides or into a slot or depression 9 formed by molding so as to provide a good fit between the glass surface and the body (sides) of the still. A trough 10 for collecting the condensate and a conduit 11 to communicate with the trough 10 to allow withdrawal of the product from the still can be provided by molding. The main base area 12 of the still provides a reservoir for the distilland and an area for collecting solar heat to effect vaporization of the distilland. The base area 12 should preferably be of a dark or black color to enhance absorption of solar or radiant heat. Alternatively, this inside surface may be painted with a dark material, or a dark surfaced material, for instance, a sheet of tar paper 13 or a layer of dirt or dark sand may be placed in the base to increase the rate of absorption of solar heat. A rough surface is also helpful. For example, small stones 14 can be placed in the base area or on the tar paper to hold it down while at the same time providing additional heat transfer surface area, and for dissipation of heat to the distilland by creating convection currents in the layer of distilland close to these surfaces. Alternatively, a rough surface pattern and/or a dark surface can be provided by molding or by a placing a preformed grid or mat on the base 12. The distilland can be replenished intermittently as needed, or continuously for instance by by passing it into the base area of the still through a suitable conduit 15. Residual distilland or brine can be withdrawn or can overflow from the still through a suitable conduit 16. A sealant may used to improve the seal formed between the cover glass 8 and the body 7 of the still or one can rely on a liquid seal provided by the condensate filling the gap between these surfaces. The inclination of the transparent sheet or cover glass 8 is sufficient to ensure that the condensates collected on its lower (inside) surface drains towards the collection trough 10 and to provide for a maximum transmission of solar heat into the still.

FIG. 111 shows a side view section of a molded plastic solar still that has an open base. This provides that it may be placed on damp soil or over another suitable source of moisture, for instance, plant material from which potable water may be obtained by vaporization and by condensation of the vapor. A condensate collection trough 17 having an outlet conduit connected therewith can be molded into one side of the still and the transparent cover sheet or glass plate 18 may be sealed to the upper surface of the molded sides 19. A detachable base 20 of any suitable material, shape or size, for instance molded plastic, may be provided. Provision is also made for placing a sponge or gridlike mat 21 or other suitable wetable material to hold water while it is being partially vaporized, for instance, when the solar still is used on shipboard, a sponge-like insert as a precaution against sloshing of the distilland is of importance. Sloshing of condensate in the trough 17 may be prevented similarly by placing a sponge-like material in it.

FIG. IV shows a side view section of a molded plastic solar still that is supported in a tilted orientation at a suitable angle during operation. One advantage of the tilted tray still is that the vapor path of flow from the distilland surface to the condensate surface is short. Another is that the material required for the wall structure to support a unit surface of glass is reduced as compared to other types of solar stills. The tilted tray still also allows for increased evaporating surface area and for a reduction of shading of the base surface area by the side walls of the still, thus increasing the radiant heat absorption at this surface and enhancing the evaporation rate of the distilland. In the preferred embodiment of the molded foamed plastic solar still of the tilted tray type shown, the side walls 22 are relatively low, thus providing for the relatively close proximity of the evaporating surface and the condensing surface, for instance, a gap of about one-half inch between these surfaces is adequate in most cases. The base 23 can have an integrally molded saw-tooth pattern 24 on its inside surface so as to provide for parallel troughs or pools of distilland and for cascading of the distilland under gravity flow from one trough to the next. Alternately, a zig-zag flow path can be provided for by arranging the distilland inflow and outflow for successive troughs to be at opposite ends thereof through the series of troughs. This provides for an elongated, zig-zag flow path of the distilland through each still and it enhances the evaporating coefficient or rate. The cover glass 25 or another suitable heat-transparent sheet can be supported loosely on a shoulder provided by molding the top edge of the side walls 22. A distillate or condensate collecting trough 26 can be provided by molding it into the side wall as shown. Distilland inlet 27 and outlet 28 conduits and a condensate outlet 29 can be provided by molding suitable holes and by inserting suitable tubular conduits as shown, for instance, short lengths of plastic pipe inserted through the side walls 22 at suitable locations. A suitable seal at 30 between the cover glass 25 and the side walls 22 may be obtained by proper molding and by relying on a liquid seal provided by condensate seeping into and sealing the gap at 30 or it may be obtained by applying a glazing compound, a plastic sealant, glue or by sticky tape applied over or in the joint at 30.

Additional shapes, sizes or modules of molded foamed plastic solar stills or sectional parts thereof can be utilized singly or in multiple series operation without departing from this specification; for instance, rounded rather than angular shapes and pre-molded sections fitted or joined together. In addition, the separate uses or functions of vaporization and condensations according to this invention are anticipated and covered by this specification. The embodiments shown and the applications described are intended as examples and this invention is not to be limited to or by these examples. For instance, these same principles can be utilized to heat water, to make or recover salt from brine, to produce distilled water for medical or pharmaceutical or photographic or industrial or domestic uses, for instance, for batteries and steam irons. Different types of foamed or foamable plastic materials can be used, for instance, polyurethane, polystyrene, styrofoam, pelafoam, etc. and different modes of molding can be utilized to produce components of the molded, foamed plastic solar still without departing from the scope of this specification.

The invention claimed is:

1. A dimensionally rigid solar distillation apparatus including a frame comprising a generally flat base and a plurality of generally upright wall members extending upwardly for a short distince and completely around the entire periphery of said base, an enclosing, bottomless and topless housing comprising a similar plurality of upright wall members of equal number but greater height than those of the base and sloping from its highest to its lowest opposite wall, said housing seating on the base within its relatively short upright wall members, said lowest opposite wall having a channel in its upper edge for collecting condensate drippings from the cover sheet, a slanted transparent cover sheet capable of transmitting radiant heat and providing an inner surface for condensation of evaporated liquid, said sheet being spaced from said base by said upright members of said housing to provide a chamber adapted to retain a body of vaporizable, brackish water in direct connect with the base and wall members of said frame, conduit means in said frame for introducing and removing brackish water and recovering liquid condensate, said apparatus consisting essentially of molded, foamed plastic material and said base having means disposed thereon for preventing sloshing of the liquid within said frame.

2. Apparatus as in claim 1 wherein said means on said base comprises spongealike means to prevent sloshing of said liquid with said frame.

3. Apparatus as in claim 1, wherein said molded foamed plastic base provides a multiplicity of parallel distilland pools within said frame, the water containing portion of said base being generally parallel to said sheet for transmitting radient heat and spaced therefrom by about 1 inch, said base having a saw-tooth profile that provides for said parallel pools of distilland in series flow connection by supporting the apparatus in a tilted orientation at a suitable angle.

4. Apparatus as in claim 1, further including provision for placing a preformed gridlike mat within said frame to enhance the rate of heat transfer to said distilland and to prevent sloshing of liquid within said frame.

5. Apparatus in accordance with claim 1 wherein said foamed plastic material is selected from expanded polyurethane and polystyrene.

* * * * *